(12) United States Patent
Shitomi et al.

(10) Patent No.: US 7,870,154 B2
(45) Date of Patent: Jan. 11, 2011

(54) METHOD AND APPARATUS FOR NAS/CAS UNIFIED STORAGE SYSTEM

(75) Inventors: Hidehisa Shitomi, Mountain View, CA (US); Takashi Oeda, Los Altos, CA (US)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 11/864,063

(22) Filed: Sep. 28, 2007

(65) Prior Publication Data

US 2009/0089335 A1    Apr. 2, 2009

(51) Int. Cl.
*G06F 7/00* (2006.01)
*G06F 17/30* (2006.01)
*G06F 12/00* (2006.01)

(52) U.S. Cl. .................. 707/781; 707/802; 707/822

(58) Field of Classification Search .......... 707/999.204, 707/781, 802, 822
See application file for complete search history.

(56) References Cited

U.S. PATENT DOCUMENTS 6,584,466 B1* 6/2003 Serbinis et al. ............... 707/10
7,376,681 B1* 5/2008 Todd et al. ................... 707/205

OTHER PUBLICATIONS

HDS: Content Archive Platform Active Solution Data Preservation Retention Center Storage, http://www.hds.com/products/storage_systems/content-archive-platform/index.html, retrieved on Oct. 31, 2008.
Centera, http://www.emc.com/products/family/emc-centera-family.htm, retrieved on Oct. 31, 2008.
EMC DiskXtender Family, http://www.emc.com/products/family/diskxtender-family.htm, retrieved on Oct. 31, 2008.

* cited by examiner

*Primary Examiner*—Mohammad Ali
*Assistant Examiner*—Kannan Shanmugasundaram
(74) *Attorney, Agent, or Firm*—Sughrue Mion, PLLC

(57) ABSTRACT

An integrated NAS/CAS system is disclosed. The system includes a view management program that is able to provide a NAS view and a CAS view of files to NAS and CAS clients. The system applied NAS or CAS features to stored files according to the view status of the file. Migration of files from NAS to CAS for archiving may be done without transmitting the file, thereby reducing bandwidth requirements and increasing security. CAS features, such as retention policy and metadata can be added to the file when its view is changed from NAS to CAS.

11 Claims, 16 Drawing Sheets

--Prior Art--

Export Management Table 2116

| Local File System | Export Name for NAS | fsid for NAS | Export Name for CAS | fsid for CAS |
|---|---|---|---|---|
| /local/fs1 | nas1 | 001 | cas1 | 010 |
| /local/fs2 | nas2 | 002 | N/A | N/A |
| /local/fs3 | N/A | N/A | cas3 | 003 |

File View Management Table 2117

| Local File System | File name ?ID? | NAS View | Status | CAS View | Status |
|---|---|---|---|---|---|
| /local/fs1 | a.txt | a.txt | Active | None | N/A |
| | b.txt | None | N/A | b.txt | Active |

[View Access]

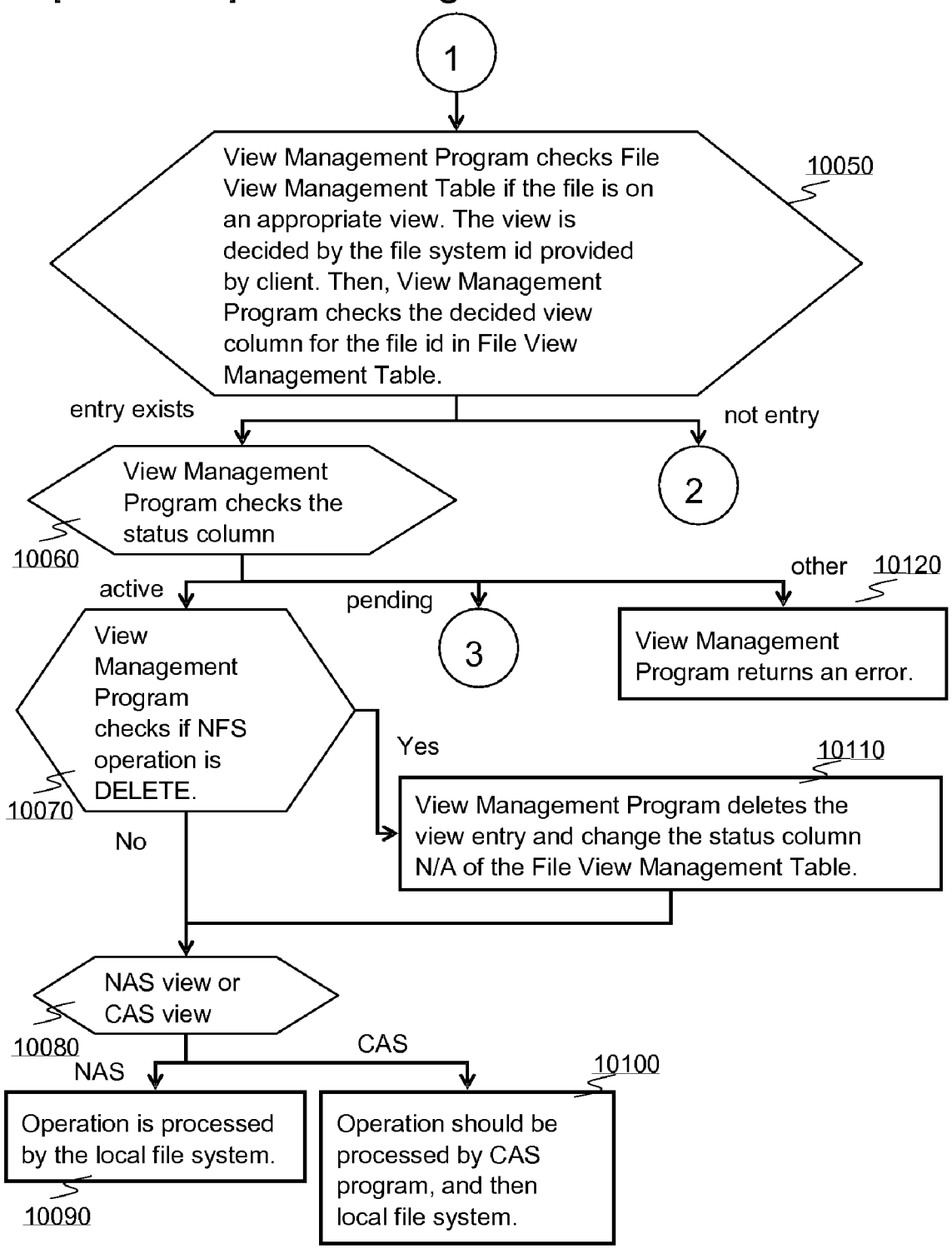

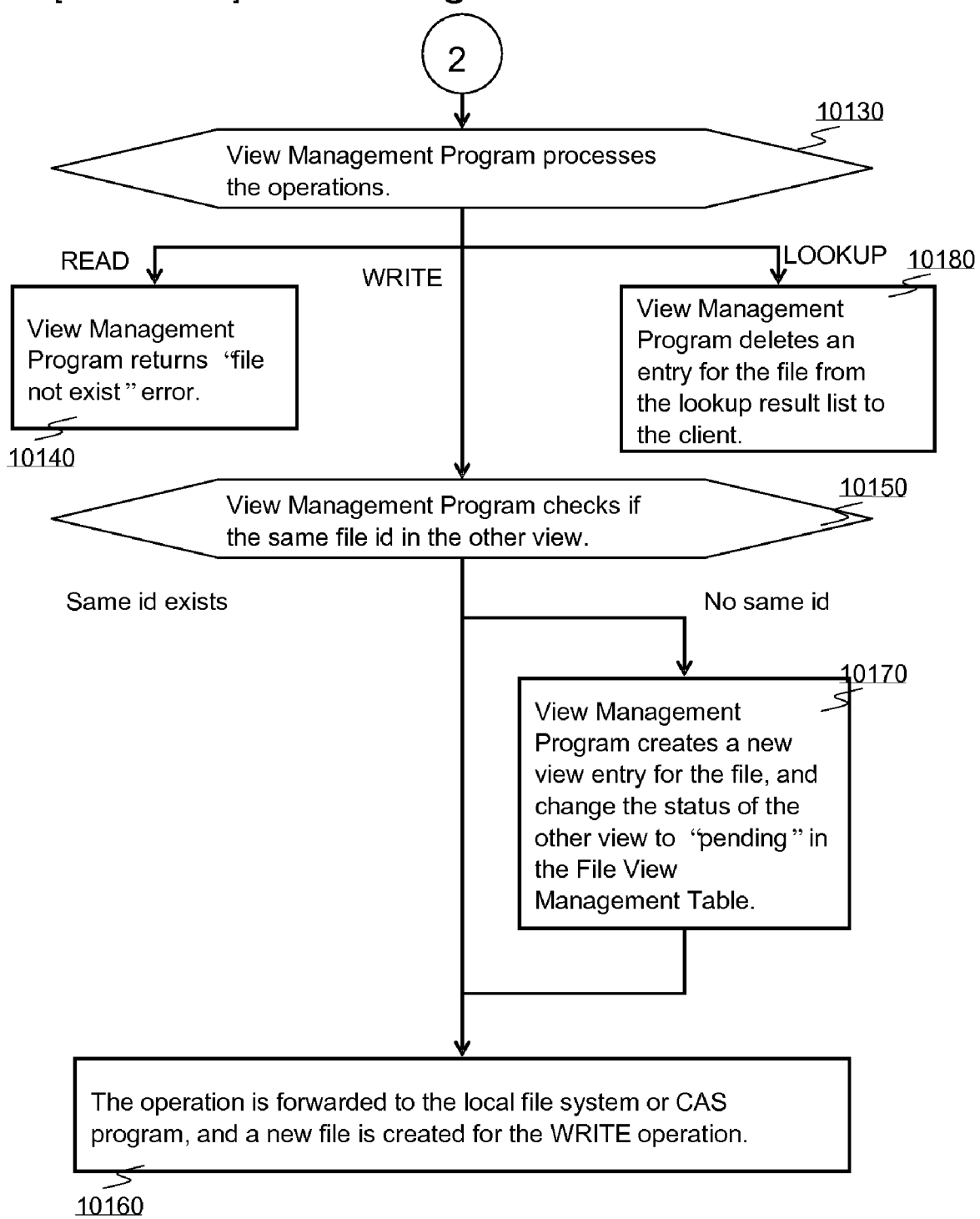

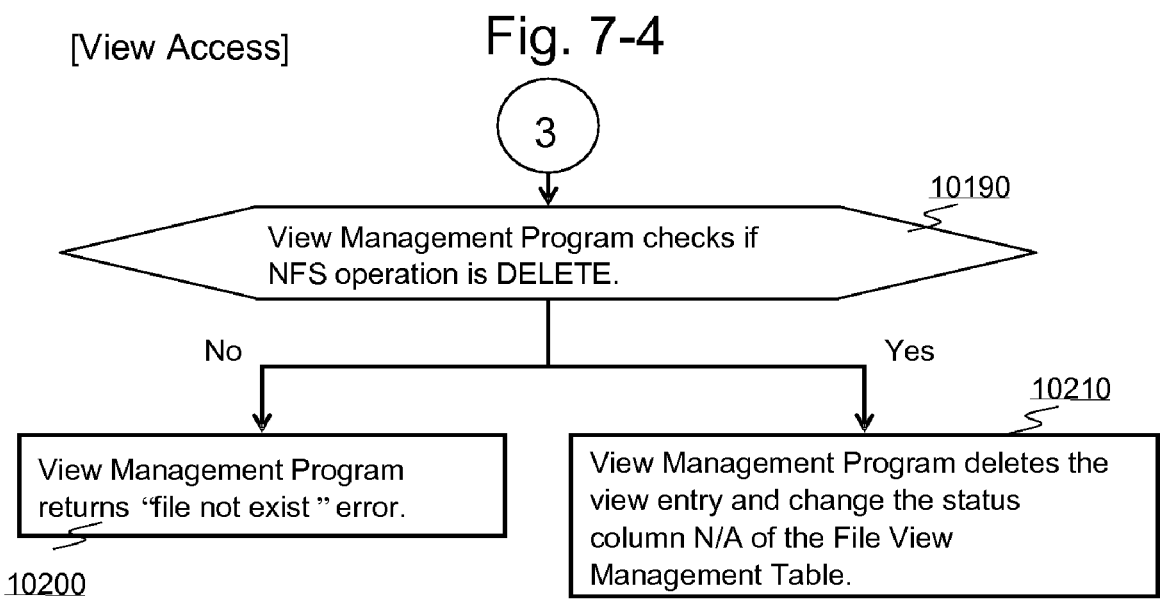

Fig. 10

File View Management Table 2117

| Local File System | File name ?ID? | NAS View | Status | CAS View | Status |
|---|---|---|---|---|---|
| /local/fs1 | a.txt | a.txt | Active | None | N/A |
|  | b.txt | None | N/A | b.txt | Active |

| Local File System | File name ?ID? | NAS View | Status | CAS View | Status |
|---|---|---|---|---|---|
| /local/fs1 | a.txt | a.txt | Pending | a.txt | Active |
|  | b.txt | None | N/A | b.txt | Active |

| Local File System | File name ?ID? | NAS View | Status | CAS View | Status |
|---|---|---|---|---|---|
| /local/fs1 | a.txt | None | N/A | a.txt | Active |
|  | b.txt | None | N/A | b.txt | Active |

METHOD AND APPARATUS FOR NAS/CAS UNIFIED STORAGE SYSTEM

BACKGROUND

1. Field of the Invention

This invention relates to method and apparatus for NAS and CAS storage systems and, more specifically, unifying NAS/CAS storage systems.

2. Related Art

Transactional data, i.e., data that is regularly accessed and modified is generally stored on a network attached storage (NAS) system. NAS systems are well known in the art, so that no further discussion is necessary herein to describe NAS systems.

With the rapid increase in the amount of digital data, the amount of fixed or reference digital contents is also growing rapidly. Generally, fixed digital data refers to digital data that does not undergo changes or editing, such as email, x-ray, voice archive, and so on. Much of these fixed contents are required to be retained for a long term, safely, and at low cost. For example, fixed data may be required to be preserved for regulatory compliance, litigation, etc. Therefore, such data needs to be stored securely and at low cost, but readily available for future retrieval.

Recently, content addressed storage (CAS) systems have been developed for archiving fixed data. As noted above, archived data must be kept unchanged for a long term. There are two typical file access methods for CAS: one is using general network file system protocols, such as NFS or CIFS, while the other is using contents ID calculated by the file name or its contents. Content address is a unique identifier of archived data, derived from the data content itself. The CAS system calculates hash value of the archived data by using hash algorithm such as MD5, SHA1 or SHA 256. Other features of CAS include, for example, write prohibition, retention period management, customer metadata addition, data integrity check, etc. For more information about CAS system and addressing, the reader is directed to U.S. Pat. No. 7,096,342.

Conventionally, the NAS and CAS systems are separate and independent systems that are linked via a communication channel, e.g., a network. Consequently, users who need both NAS and CAS systems need to acquire and maintain two separate systems and link them via a communication channel to ensure proper archiving of data. A conceptual diagram of an example of a prior art NAS and CAS linked systems is shown in FIG. 1, illustrating, among others, existing method of archiving. When the NAS client 1000 stores files of transactional data, the files are stored in storage system 3200 of NAS system 3000. When files stored in storage system 3200 need to be archived, they are transferred to storage system 4200 of CAS system 4000 via network 5000. When the file is stored in storage system 4200 various features are associated with the file, such as, e.g., meta data, retention policy, write protect, etc.

In one example of prior art archiving, illustrated in FIG. 1, the CAS client 1200 mounts a file system whose export name is nas1 3500 as /nas1, and mounts a file system whose export name is cas1 4500 as /cas1. Based on the pre-determined policies, which were set by an administrator, the policy management program 1212 invokes the migration program 1214. The migration program reads a file from the NAS such as "/nas1/a.txt". The migration program invokes a metadata management program 1213. The metadata management program adds some custom metadata for the file in order to help searching and retrieval of the file when necessary. The migration program writes the file and metadata on CAS such as "/cas1/a.txt". The file retrieval from the CAS system is also executed by the archive application 1211.

The inventor of the subject application has appreciated that such prior art systems present several issues. First, the purchase and maintenance of two separate systems present a burden on organizations requiring both a NAS and CAS systems. Second, the necessity for transmitting files to be archived from the NAS to the CAS system over the network presents network bandwidth and security issues.

SUMMARY

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various aspects of the invention provide methods and apparatus, which address the issues associated with the prior art separate NAS/CAS systems. Various aspects of the invention enable purchase and maintenance of a single system, while avoiding the bandwidth and security issues involved in transmitting files to be archived over a network.

According to aspects of the invention NAS and CAS are implemented in the same integrated storage system. A view management module provides NAS or CAS view of files depending on the type of request received and on whether the request originated from a NAS or CAS client. In this manner a single storage system enables viewing both NAS files and CAS files. Additionally, the system manages migration from NAS to CAS. When the migration is between two different file systems in the integrated storage system, the system copies the file from the NAS file system to the CAS file system. On the other hand, when the migration is within the same file system, the integrated storage system simply changes the pointer of the file, but does not move it to another storage location. Additionally the integrated system associates CAS features, such as metadata, retention policy, etc., upon archiving a file.

According to aspects of the invention, a method for providing and managing an integrated network attached storage (NAS) and content addressable storage (CAS) system is provided, the method comprising: providing a storage system having a network interface, storage head, and at least one logical unit; operating a view management program to review each client request received from the network interface and determine whether the source of the request is a NAS client or a CAS client; and, providing a NAS view when the source is a NAS client and a CAS view when the source is a CAS client. The method may further comprise maintaining an export management table having entries therein corresponding to local file system name, export name for NAS, file system ID for NAS, export name for CAS, and file system ID for CAS, and access control information. The method may further comprise maintaining a file view management table having entries therein corresponding to local file system name, file name, NAS view pointer, NAS status, CAS view pointer, and CAS status. The method may further comprise: upon receiving an archiving request for a designated file from a CAS client, changing the status of the designated file to "pending" whereby the file is not available for a NAS operation other than a delete operation. The status of the designated file mat be changed to "inactive" after the CAS client performed a delete operation of the designated file. The method may further comprise: upon receiving an archiving request for a designated file from a CAS client, changing corresponding entries in the view status table while maintaining the file at the same storage location. The method may further comprise: upon receiving an archiving request for a designated file from a CAS client, copying the file onto a different file system within the storage system and changing corresponding entries in the view management table. The method may further comprise associating metadata and retention policy with the designated file.

According to other aspects of the invention, an integrated network attached storage (NAS) and content addressable storage (CAS) system are provided, comprising: a network interface; a storage system head; a storage controller; at least one physical storage device;

wherein the storage head operates to serve requests received from the network interface and provide a NAS view or CAS view according to the type of the requests and according to whether the requests originate from a NAS client or CAS client. The system may further comprise a view management program operable by the storage head. The system may further comprise export management table having entries therein corresponding to local file system name, export name for NAS, file system ID for NAS, export name for CAS, and file system ID for CAS, and access control information. The system may further comprise a file view management table having entries therein corresponding to local file system name, file name, NAS view pointer, NAS status, CAS view pointer, and CAS status. The system may further comprise a migration module operable within the storage head. The system may further comprise metadata management module. The system may further comprise a CAS client coupled to the network interface. The CAS client may comprise an archiving module.

According to further aspects, the invention is implemented an integrated network attached storage (NAS) and content addressable storage (CAS) system having a network interface, a storage system head, a storage controller, and at least one physical storage device, by providing a method for archiving a file, comprising: upon receiving from a CAS client an archiving read request for a specified file on a NAS view via the network interface, presenting the file to the CAS client; issuing an operation failed or file doesn't exist indication for any request other than "delete" received from a client to the specified file on a NAS view; upon receiving indication that archiving operation has been completed, issuing a "file does not exist" indication for any request received from a client to the specified file on a NAS view. The method may further comprise upon receiving the archiving request for the specified file, changing a status indicator of the specified file to "pending" whereby the file is not available for a NAS operation other than a delete operation. The method may further comprise upon receiving the archiving request for the specified file, changing corresponding entries in a view status table while maintaining the file at its current storage location. The method may further comprise maintaining a an export management table having entries therein corresponding to local file system name, export name for NAS, file system ID for NAS, export name for CAS, and file system ID for CAS, and access control information; and further comprising maintaining a file view management table having entries therein corresponding to local file system name, file name, NAS view pointer, NAS status, CAS view pointer, and CAS status.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 5 represents an example of Export Management Table maintained by the View Management Program.

FIG. 6 illustrate an example of File View management Table maintained by the View Management Program.

FIGS. 7-1, 7-2, 7-3, and 7-4 represent an example of control flow of file access through a view provided by NAS/CAS unified system.

FIG. 10 illustrates a table content transition during the file archiving according to an embodiment of the invention.

DETAILED DESCRIPTION

The following is a detailed description of several embodiments according to the invention. The embodiments enable unifying the NAS and CAS systems so that a single system needs to be purchase and maintained. Furthermore, the bandwidth and security risks associated with transmission of files to be archived are eliminated. The following functionalities are characteristics of the invented storage system.

The integrated NAS/CAS system can provide different features based on the client's or file's view. Notably, the features can be provided with respect to the export or share name of the file system.

The integrated NAS/CAS system can provide a different view for the same file system by providing separate export name.

A file can be moved from one view to another view without having to transmit the file.

At the migration, some feature can be activated or deactivated.

Figure 2:
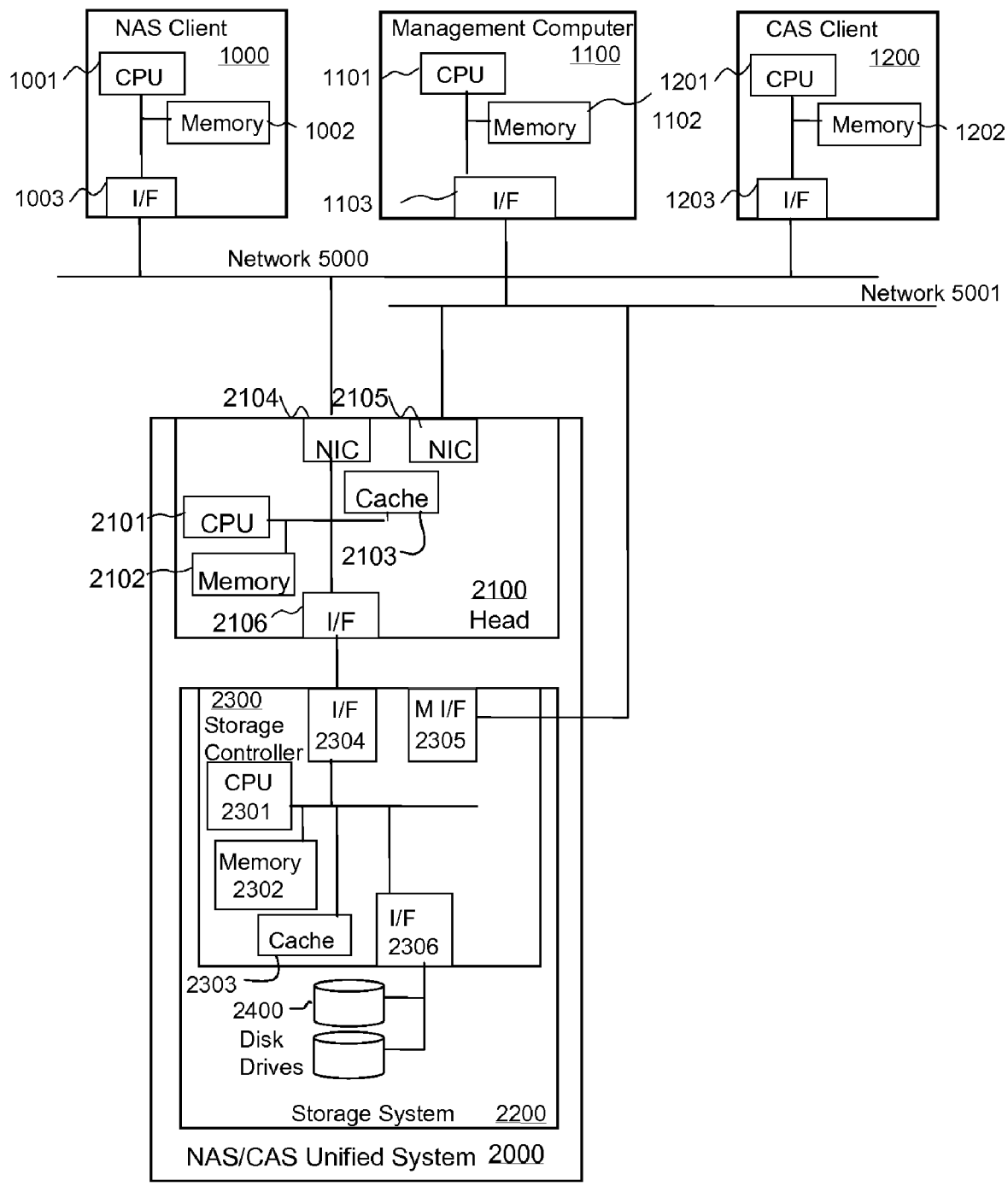
FIG. 2 schematically illustrates an example of hardware configuration in which the method and apparatus of this invention are applied.

In order to realize these features, several additional modules are implemented between the NFS server program and the local file system program layer. FIG. 2 schematically illustrates an example of hardware configuration in which the method and apparatus of this invention are applied. The system is composed of NAS Clients 1000, Management Computer 1100, CAS Client 1200, and NAS/CAS Unified System 2000. Specific details of these elements are as follow.

- NAS Clients 1000: Application and NFS (general Network File System) client software, which are not drawn in FIG. 2, are running on a CPU 1001. The NAS client is using Network Interface (I/F) 1003 to connect to the NAS/CAS Unified Systems 2000 via Network 5000. The Network 5000 and 5001 can be either physically separate network or logically separate network by utilizing network-partitioning technology such as VLAN. The typical media of the network 5000 and 5001 is an Ethernet.

- CAS Clients 1200: Archiving application and NFS client software or proprietary communication software, which are not drawn in FIG. 2, are running on a CPU 1201. The CAS client is using Network Interface (I/F) 1203 to connected to the NAS/CAS Unified Systems 2000 via Network 5000.

- Management Computer 1100: Management Software, which is not drawn in FIG. 2, is running on a CPU 1001. The Management Computer is using network interface (I/F) 1103 to connect to the Head 2100 and Storage Systems 2200 via Network 5001.

- NAS/CAS Unified System 2000: It consists of mainly two parts: Head 2100 and Storage System 2200. The storage system 2200 consists of a Storage Controller 2300 and Disk Drives 2400. Head 2100 and storage system 2200 can be connected via interface 2106 and 2304. Head 2100 and storage system 2200 can exist in one storage unit, called Filer. In this case, the two elements are connected via system bus such as PCI-X. Moreover, the head can include internal disk drives without connecting any storage controller, which is quite similar to the general-purpose server. On the other hand, the head and controller can be physically separated. In such a case, the two elements are connected via network connections such as Fibre Channel or Ethernet. Although there are various hardware implementations, any implementations can be applied to the invention.

FIG. 2 illustrates a single node configuration of NAS/CAS system according to an embodiment of the invention. Especially for a CAS system, multiple heads or the system itself usually configures a cluster and the cluster provides a single system image. Recently a NAS system can also configure a multimode cluster. The heads or system itself of NAS/CAS system can also configure a cluster. The cluster configuration does not affect the invention.

The Head 2100 comprises CPU 2101, memory 2102, cache 2103, Frontend network interface (NIC) 2104, management network interface (NIC) 2105, and disk interface (I/F) 2106. The NICs 2104 and 2105 can be either physically separate or logically separate. It processes requests from NAS clients 1000, Management Host 1100, and CAS Client 1200.

- CPU 2101 and memory 2102: The program to process NFS requests or other operations is stored in the memory 2102. CPU 2101 executes the program.

- Cache 2103: It stores NFS write data from NFS clients 1000 temporarily before the data is forwarded into the storage system 2200, or it stores NFS read data that are requested by the NFS clients 1000. It may be a battery backed-up non-volatile memory. In another implementation, memory 2102 and cache memory 2103 are commonly combined within the same memory.

- Frontend network interface 2104: It is used to connect both between NAS clients 1000, CAS clients 1200 and Head 2100. The Ethernet is a typical example of such connection.

- Management network interface 2105: It is used to connect both between management computer 1100 and Head 2100. The Ethernet is a typical example of the connection.

- Disk interface 2106: It is used to connect between head 2100 and storage system 2200. The Fibre Channel (FC) and Ethernet are typical examples of such connection. In the case of internal connection between head and controller (i.e. single storage unit implementation), system bus is a typical example of the connection.

The storage controller 2300 comprises CPU 2301, memory 2302, cache memory 2303, frontend interface 2304, management interface (M I/F) 2305, and disk interface (I/F) 2306. It processes I/O requests from the Head 2100.

- CPU 2301 and memory 2302: The program to process I/O requests or other operations is stored in the memory 2302. CPU 2301 executes the program.

- Cache memory 2303: It stores the write data from the Head 2100 temporarily before the data is stored into disk drives 2400, or it stores the read data that are requested by the Head 2100. It may be a battery backed-up non-volatile memory. In another implementation, memory 2302 and cache memory 2303 are commonly combined within the same memory.

- Host interface 2304: It is used to connect between Head 2100 and storage controller 2300. The Fibre Channel (FC) and Ethernet are typical examples of the connection. A system bus connection such as PCI-X can be applied.

- Management interface (M I/F) 2305: It is used to connect between Management Computer 1100 and storage controller 2300. The Ethernet is a typical examples of the connection.

- Disk interface (I/F) 2306: It is used to connect disk drives 2400 and the storage controller 2300.

- Disk Drives 2400: Each of the disk devices processes the I/O requests in accordance with disk device commands such as SCSI commands.

Other appropriate hardware architecture can be applied to the invention.

Figure 3:
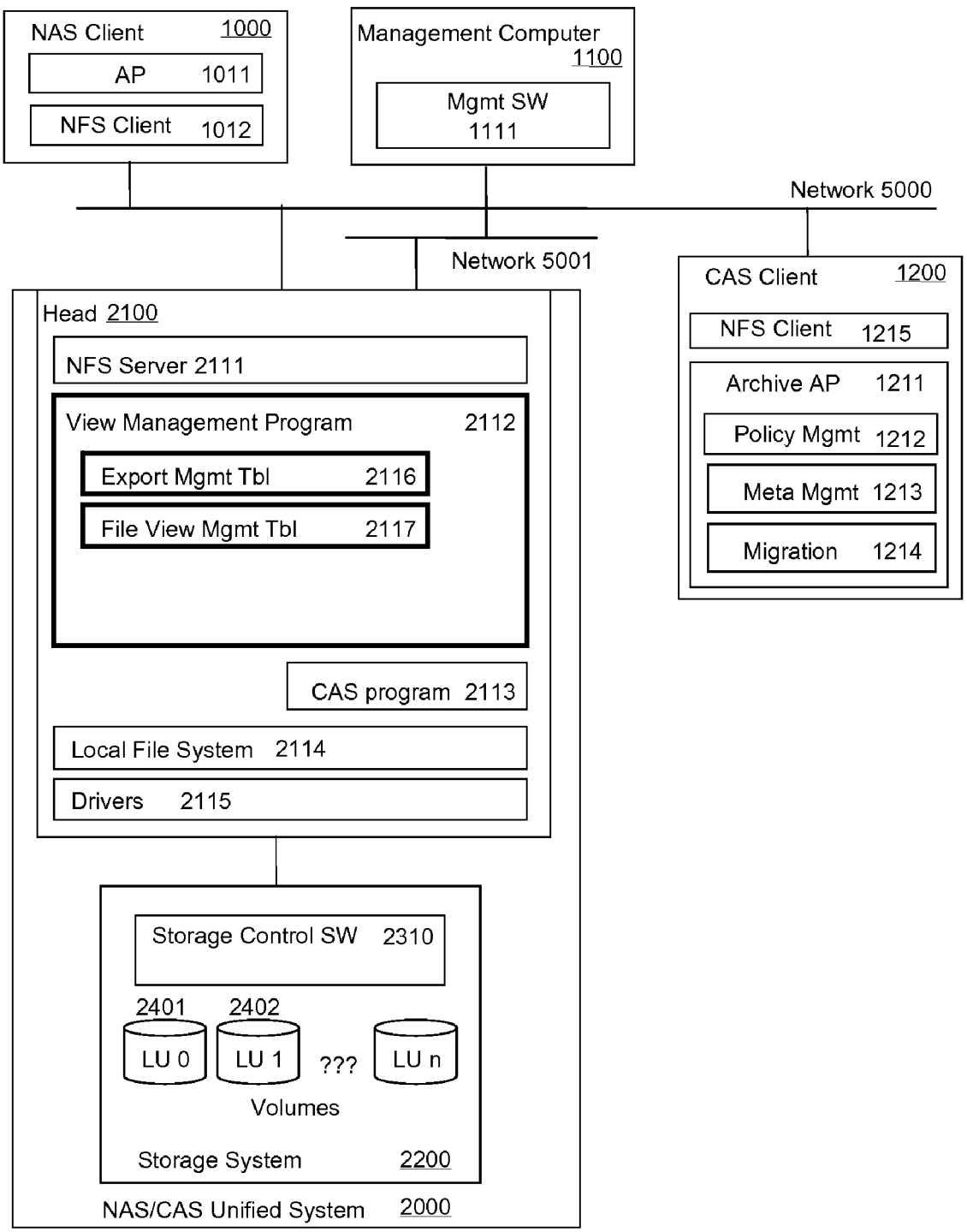
FIG. 3 illustrates an example of software configuration in which the method and apparatus according to an embodiment of this invention are applied.

FIG. 3 illustrates an example of software configuration in which the method and apparatus according to an embodiment of this invention are applied. The system is composed of NAS Clients 1000, Management Computer 1100, CAS Client 1200, and NAS/CAS Unified System 2000, the details of which are as follows.

NAS Clients 1000: NAS client 1000 is a computer on which some application (AP) 1011 generates file-manipulating operations. A Network File System (NFS) client program such as NFSv2, v3, v4, or CIFS 1012 is also on the NAS client node 1000. The NFS client program communicates with an NFS server program on NAS/CAS Unified Systems 2000 through network protocols such as TCP/IP. The NFS clients and NAS/CAS Unified System are connected via a network 5000 such as LAN.

Management Host 1100: Management software 1111 resides on the Management Computer 1100. NAS/CAS management operations such as system configuration settings can be issued from the management software 1111.

CAS Clients 1200: CAS client 1200 is a computer on which archive application (AP) 1211 generates file archiving operations. An administrator can set archiving policies (e.g. timing of archiving, retention period, etc.) in Policy Management program 1212. A Metadata Management program 1213 adds metadata to a file at archiving in order to ease file search at retrieval. A Migration program 1214 moves a file from NAS to CAS and vice versa. A proprietary network communication program or general Network File System (NFS) client program such as NFSv2, v3, v4, or CIFS 1215 is also on the CAS client. The program communicates with a proprietary communication server program or an NFS server program on NAS/CAS Unified Systems 2000 through network protocols such as TCP/IP. The CAS clients and NAS/CAS Unified System are connected via a network 5000 such as LAN.

NAS/CAS Unified System 2000: It consists of mainly two parts: Head 2100 and Storage System 2200.

Head 2100: Head (in another word, Gateway) 2100 is a part of a NAS/CAS Unified System 2000. Operations to NAS/CAS Unified System 2000 are processed in this module.

NFS server program 2111 communicates with NFS client on both NAS clients and CAS clients, and processes NFS operations to the file systems managed by NAS/CAS Unified System 2000.

View Management Program 2112 provides views of NAS and CAS for file systems on NAS/CAS Unified System 2000. It is implemented between NFS server program and local file system program. One implementation method to provide a separate view for NAS and CAS is based on the export name of file system. Export Management Table 2116 is utilized for the management of export name. Moreover, it is possible to provide separate view of NAS and CAS for the same file system. File View Management Table 2117 is used for the view control for a single file. The tables are stored in the memory of head 2102, or disks on storage system 2400. The management tables should be synchronized between nodes when the NAS/CAS system makes a multinode cluster and provides a single system image.

CAS Program 2113 provides CAS features such as overwrite prohibition, retention management, data integrity check, and custom metadata manipulation. The program can be invoked by CAS views. The features are inactive for NAS views.

The local file system 2114 processes file I/O operations to the file systems on the storage system 2200.

Drivers of storage system 2115 translate the file I/O operations to the block level operations, and communicate with storage controller 2300 via SCSI commands.

Storage System 2200: A storage control software 2310 processes SCSI commands from head 2100. Volume 2401 and 2402 are composed of one or more disk drives 2400. File systems are created in a volume or on multiple volumes.

From the feature point of view, CAS can be seen as a rich featured NAS. Additional feature examples are write prohibition, retention period management, customer metadata addition, data integrity check, and so on. Due to the performance or bit cost requirement differences, as of now, these systems are separate. However, according to embodiments of the invention, both systems are implemented on the same platform. According to the invention a unified storage system is provided. According to embodiments of the invention, the following features may be implemented in any desired combination.

The integrated NAS/CAS system can provide different features based on the view of the file, e.g., based on the export or share name of the file system.

The integrated NAS/CAS system can provide a different view for the same file system, providing separate export name.

A file can be moved from one view to the other view without the need to transfer the file itself.

At the migration for archiving, some features can be activated or deactivated based on administrator input.

Figure 4:
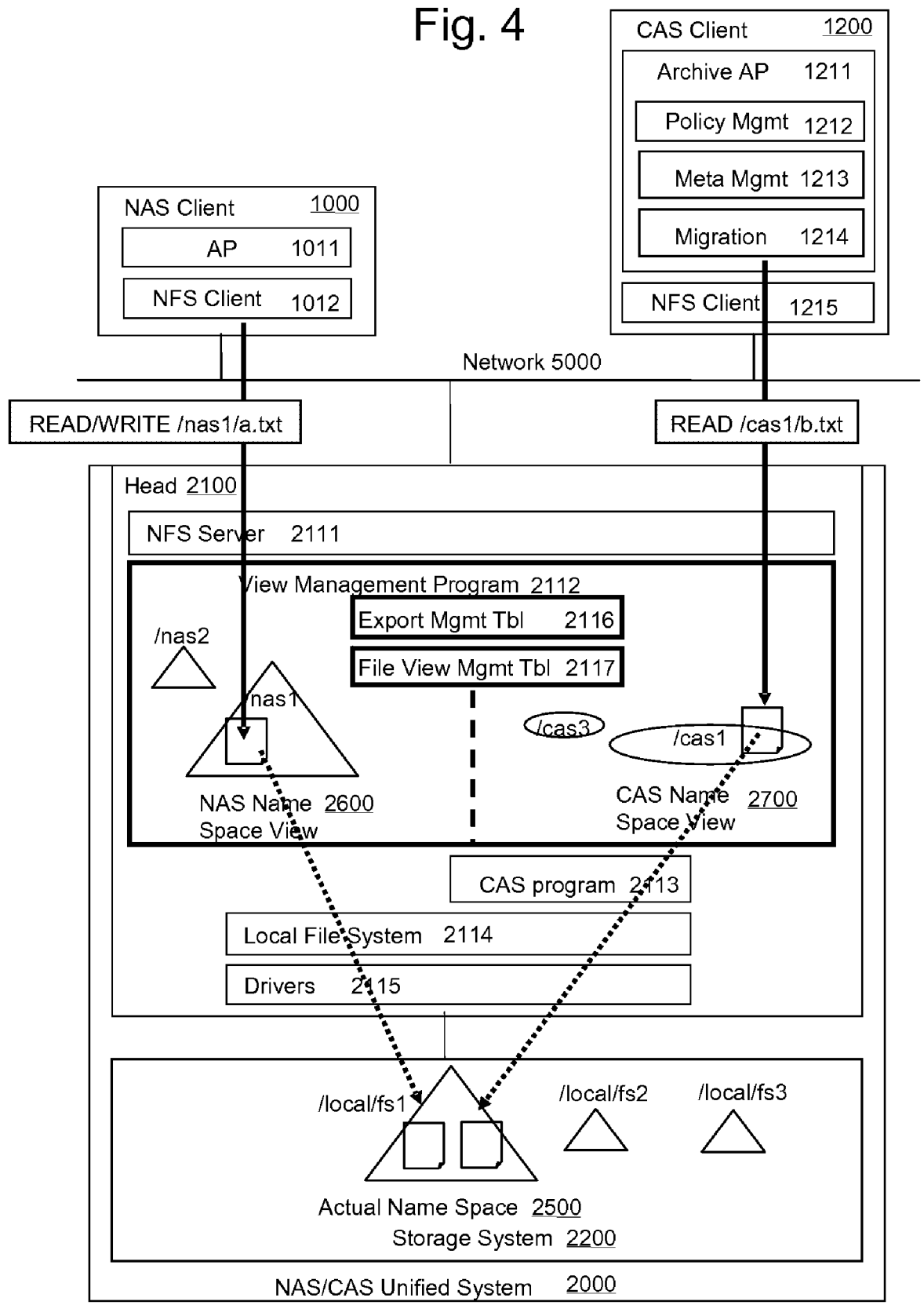
FIG. 4 illustrates a conceptual diagram of the view creation mechanism according to an embodiment of the invented NAS/CAS unified system.

In order to realize these features, several additional modules are implemented between NFS server program and local file system program layer. FIG. 4 shows a conceptual diagram of the view creation mechanism according to an embodiment of the invented NAS/CAS unified system. In this example, three local file systems (i.e. /local/fs1, /local/fs2, /local/fs3) exist in NAS/CAS unified storage system. FS2 has just NAS view (export name nas2); FS3 has just CAS view (export name cas3); and FS1 has both NAS (export name nas1) and CAS view (export name cas1). The following exemplifies setup of export management and views of the files.

Figures 1, 5, 6, 7:
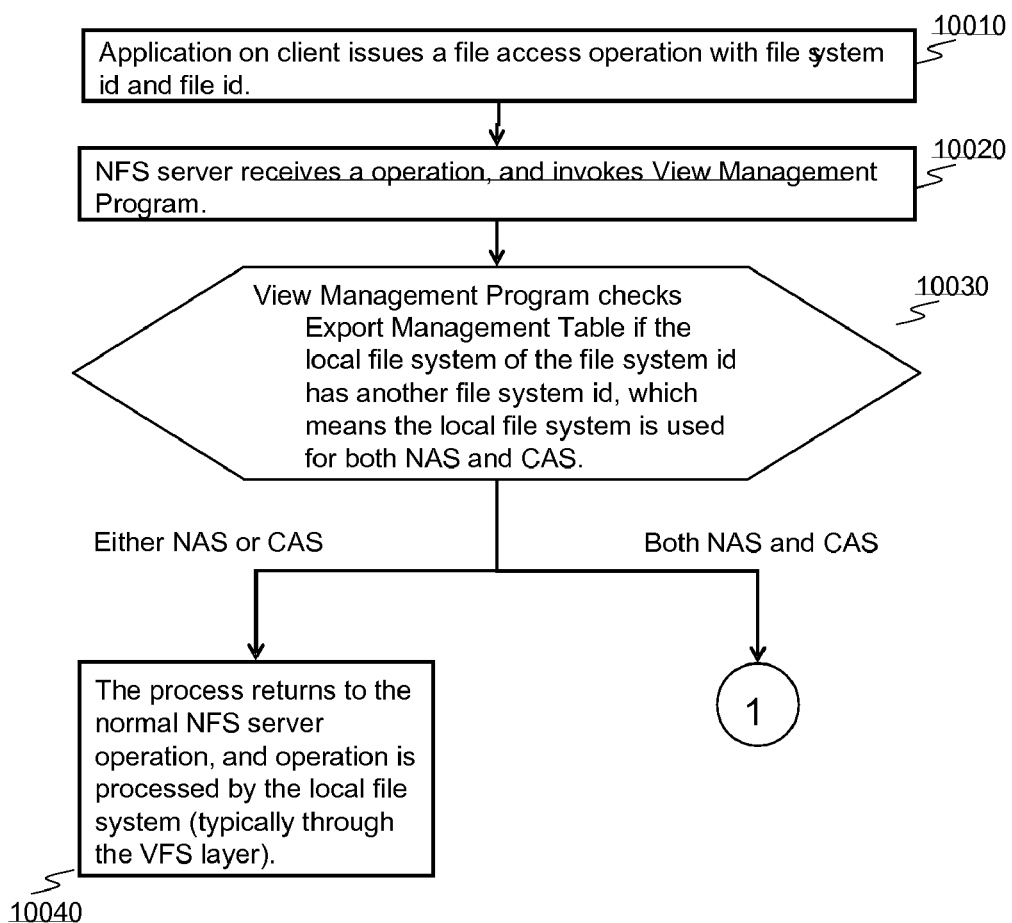

FIG. 5 represents an example of Export Management Table 2116 maintained by the View Management Program 2112. Export name for a local file system is registered in the Export Management Table. Just one export name for a file system is registered in the existing export management table, which is usually managed by the NFS server program. However, the invention employs a new export management table, which has multiple export names for a file system (i.e. for NAS and CAS). File system IDs (fsids) are also registered in the table. The IDs are used for system internal use, not for users. Access control information can be added to the table (This is not depicted in FIG. 5). For example, IP addresses for access allowed clients can be added. According to access control information, the view management program 2112 controls an access to the file system.

FIG. 6 shows an example of File View management Table 2117 maintained by the View Management Program 2112. As describe herein, a file system can have both NAS and CAS views (e.g. FS1). In this case, there are multiple export name entries for a file system in the export management table 2116. In addition, file view management table 2117 is needed. The table determines the view in which a file should be shown. As shown in FIG. 6, file name a.txt can be seen by NAS and is active, but cannot be seen by CAS. That is, if a CAS client attempts to access this file, the file will appear as empty. On the other hand, file b.txt cannot be seen by NAS client, but can be seen by CAS client.

At first, the information is registered by an administrator. In many cases, all files are in NAS or CAS view at the beginning. Then, in order to reduce the labor of administrator, the GUI or CLI of file view management table setup should have an option such as all files in the same view. After the initial phase, the migration process is done by an archive application. A view for a file can be moved from one view to the other view. At migration, the table update is done by View Management Program 2112. The status of each view is also registered in the table. The status field is used for file migration procedure. When a file is on one view, the status field for the view should be "active". However, there is some critical situation during file migration. The migration process, which is done by archive application, is constructed by read, write, and delete. If a status field of a source file is turned to be "N/A" at the finish of destination write, it is impossible for archive application to delete the file. Then, if we would like to keep the archive application operations, the status of a source file should be changed at the deletion. Then, between the write and delete, the file is active on both NAS and CAS. In order to avoid the situation, "pending" status is provided according to an embodiment of the invention. During the pending status, the file should not be shown in the NAS view, but the view management program can receive a file delete operation, and can delete the entry of source file from the File View Management Table.

In the above and following, file system ID and file ID are used to identify a file system and a file. Any other identifier can be utilized in the invention. Moreover, the invention is not restricted by network file sharing protocol. Although the embodiments are based on some network file system technology, the invented processes implemented in the NAS/CAS unified storage system can be applicable to any network file system protocol.

The following describes how the integrated NAS/CAS unified storage system processed file access operations for each view. According to the above setup, each client and application are configured as the following. While we use the exemplified configurations for the following explanations, the procedure describes here is applicable in any configuration implementing features of the invention.

NAS client 1000 mounts export name "nas2" as "/nas2" (nas2 is just for NAS view). AP 1011 can access a file on /nas2 such as "/nas2/a.txt".

CAS client 1200 mounts export name "cas3" as "/cas3" (cas3 is just for CAS view). Archive AP 1211 can access a file on /cas3 such as "/cas3/a.txt".

NAS client 1000 mounts export name "nas1" as "/nas1" (nas1 is for both NAS and CAS view). AP 1011 can access a file on /nas1 such as "/nas1/a.txt".

CAS client 1200 mounts export name "cas1" as "/cas1" (cas1 is for both NAS and CAS view). Archive AP 1011 can access a file on /cas1 such as "/cas1/b.txt".

During the mount phase, NFS server 2111 checks if each client has an access right to each export by looking up the export management table 2116. If the client has a right, the NFS server returns a file system ID, which means a view for the client is determined here. If the client does not have a right, NFS server rejects a mount request.

FIGS. 7-1, 7-2, 7-3, and 7-4 represent an example of control flow of file access through a view provided by NAS/CAS unified system.

1. An application on client issues a file access operation with file system ID (which usually is obtained at mount phase) and file ID (which usually is obtained at OPEN or LOOKUP operation) such as OPEN, READ, WRITE, and so on. (Step 10010)
2. NFS server 2111 receives an operation request, and invokes View Management Program 2112. (Step 10020)
3. View Management Program checks Export Management Table to check if the local file system of the file system ID has another file system ID, which means the local file system is used for both NAS and CAS. (Step 10030)
   ① If the local file system is for either NAS or CAS, NAS/CAS unified system 2000 may show the local file system structure to the client. Then, the process returns to the normal NFS server operation, and operation is processed by the local file system 2114 (typically through the VFS layer). (Step 10040)
   (OPTION1) NAS/CAS unified system can show some different file system structure to the client. In this case, the View Management Program needs to implement file system like data structure for each view such as mode table and directory list.
   (OPTION2) Especially for CAS view, some applications expect flat name space based on the hash value of the content. In this case, the View Management Program does not have to have file system like data structure, but needs to have a mapping table between content ID and a path name on local file system.
   ② If the local file system is for both NAS and CAS, a file on the local file system has to be on either NAS or CAS view. NAS/CAS unified system 2000 controls each file view. View Management Program 2112 checks File View Management Table 2117 if the file is on an appropriate view. The view is decided by the file system ID provided by the NAS or CAS client. Then, View Management Program checks the decided view column for the file ID in File View Management Table. (Step 10050)
   I. If there is an entry on the view column, View Management Program checks the status column. (Step 10060)
      1. If the status column is "active", View Management Program checks if the NFS operation is DELETE or not. (Step 10070)
         a) If the operation is not DELETE, the operation should be processed. In the case of NAS view, the operation is processed by the local file system 2114 (Step 10090). In the case of CAS view, the operation should be processed by CAS program 2113, and then local file system 2114 (Step 10100).
         b) If the operation is DELETE, View Management Program deletes the view entry and changes the status column N/A of the File View Management Table (Step 10110). And then, the operation is forwarded to the local file system or CAS program.
      2. If the status column is "pending", View Management Program just receives DELETE operation. (Step 10190)
         a) If the operation is not DELETE, View Management Program returns "file does not exist" error. (Step 10200)
         b) If the operation is DELETE, View Management Program deletes the view entry and change the status column N/A of the File View Management Table. (Step 10210)

3. Otherwise, View Management Program returns an error. (Step 10120)

II. If there is no entry on the view column, View Management Program processes the operations as the followings. (Step 10130)

1. If the operation is READ (or READ OPEN), View Management Program returns "file does not exist" error. (Step 10140)
2. If the operation is WRITE (or WRITE OPEN), View Management Program checks if the same file ID exists in the other view. (Step 10150)
   a) If the same file ID does not exists in the other view, the operation is forwarded to the local file system or CAS program, and a new file is created for the WRITE operation. (Step 10160)
   b) If the same file ID exists in the other view (actually this is the case of migration), View Management Program creates a new view entry for the file, and change the status of the other view to "pending" in the File View Management Table. (Step 10170) The operation is forwarded to the local file system or CAS program, and a new file is created for the WRITE operation.
3. If the operation is LOOKUP, View Management Program forwards the operation to the local file system, and deletes an entry for the file from the lookup result list to the client. (Step 10180)

According to the above procedure, if there is no migration between NAS and CAS, files which are inputted from NAS view can be seen only in the NAS view, while files which are inputted from CAS view can be seen only in the CAS view.

Figure 8:
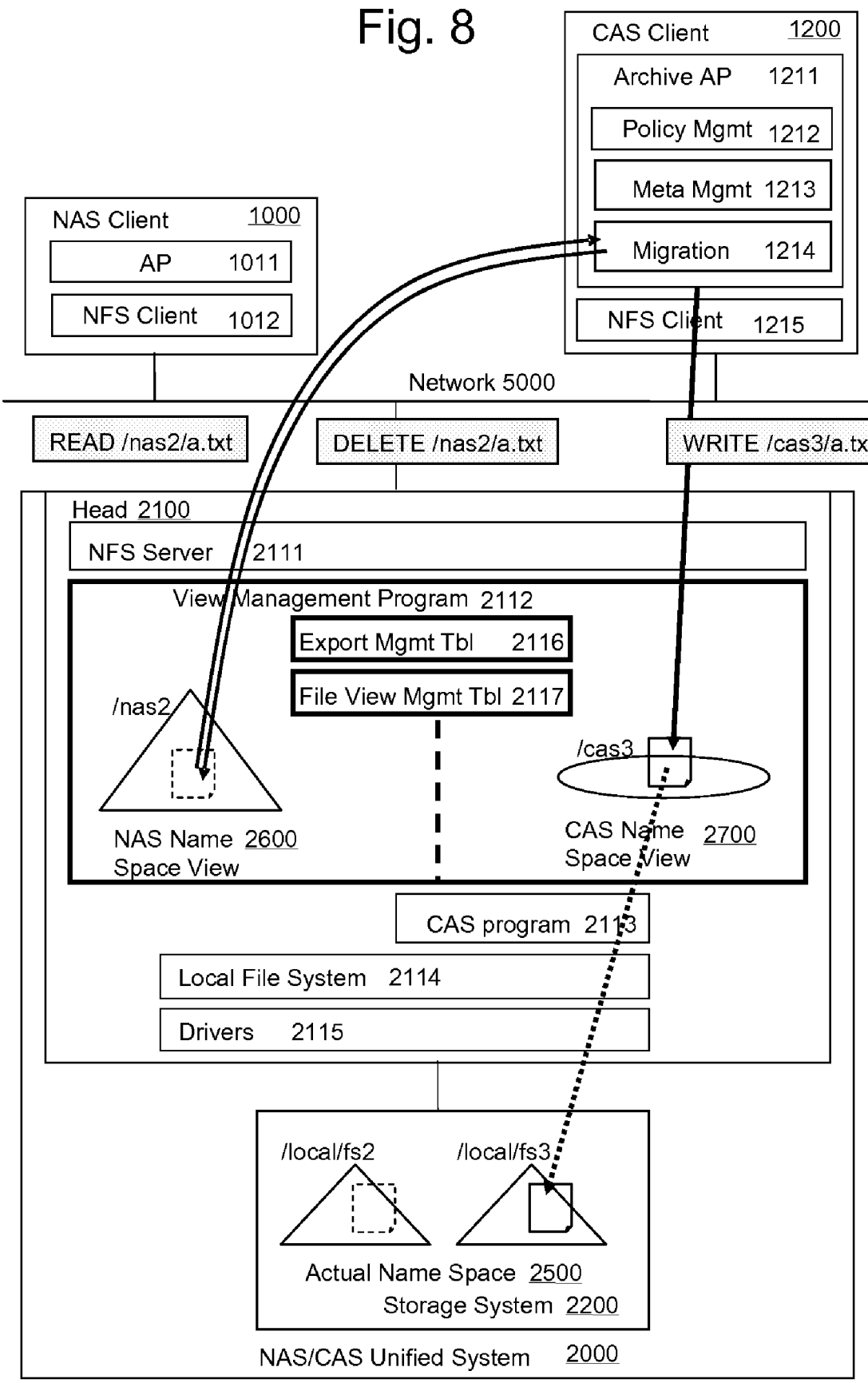
FIG. 8 illustrates a conceptual diagram of file archiving with NAS/CAS unified system according to an embodiment of the invention.
Figure 9:
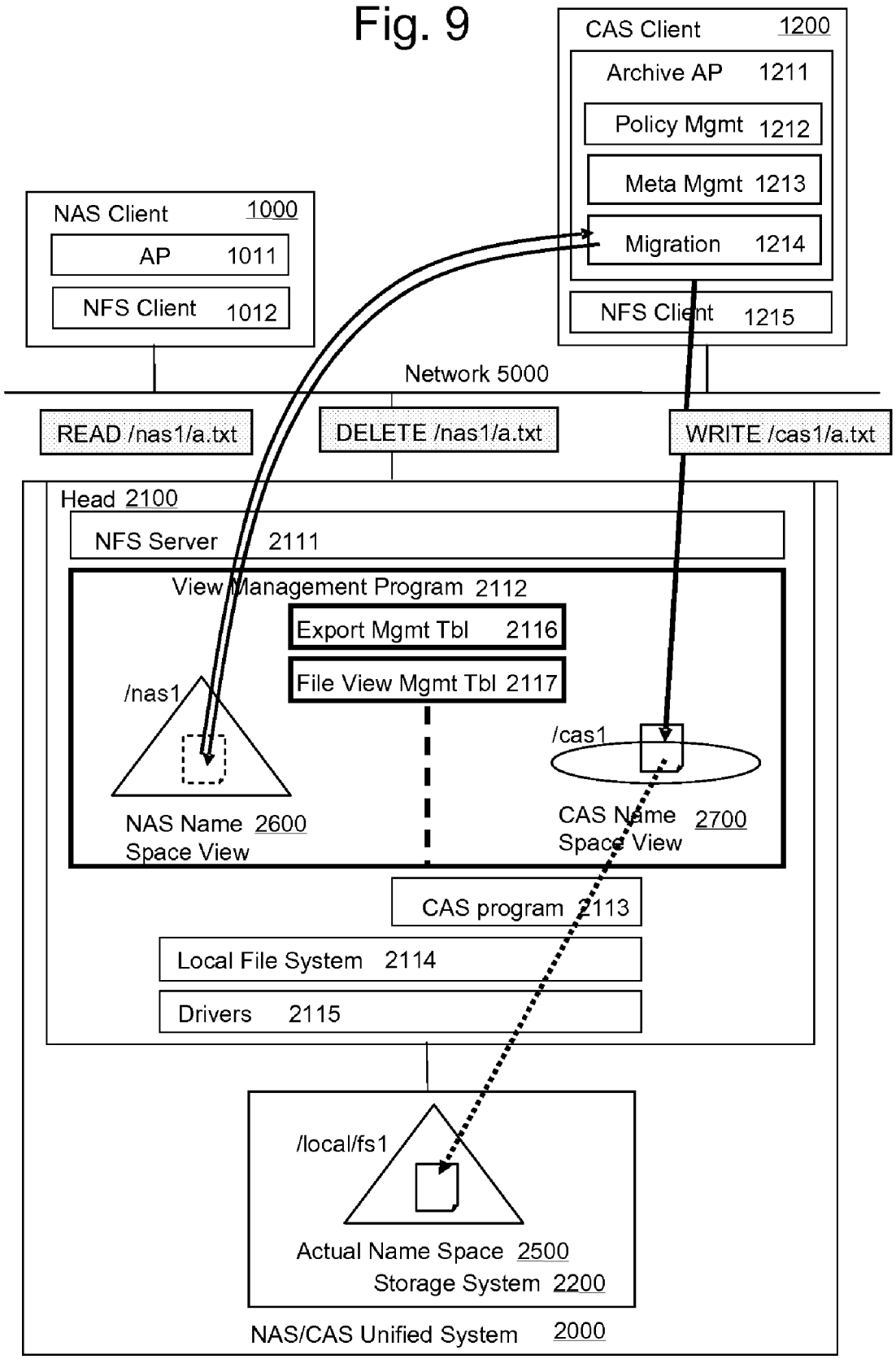
FIG. 9 illustrates another conceptual diagram of file archiving with NAS/CAS unified system according to an embodiment of the invention.

FIG. 8 shows a conceptual diagram of file archiving with NAS/CAS unified system 2000, according to an embodiment of the invention. In this example, a file is moved from NAS ("/nas2/a.txt") to CAS ("/cas3/a.txt"). This is a migration between different local file systems, and the actual file movement is necessary. When the archiving application accesses the system for archiving purposes, the system provides the CAS client a NAS view of file /nas2. Consequently, from the archiving application view this is the same as if the CAS client makes the request to a separate NAS system. The archiving application then reads the file and writes it into the CAS file system. For that purpose, the integrated NAS/CAS system provides the application a CAS view, so that from the CAS client perspective it is the same operation as writing a file to an independent CAS system. Once the file has been written into the CAS file system, the original file is deleted. Here, since the archiving application reads the file from fs2 and writes it into fs3, there is actual move of the file FIG. 9 shows another conceptual diagram of file archiving with NAS/CAS unified system 2000 according to an embodiment of the invention. In this example, a file is moved from NAS ("/nas1/a.txt") to CAS ("/cas1/a.txt"). This is a migration between different views, but on the same local file system. According to a feature of this embodiment of the invention, the actual file movement is not necessary. Rather several management operations are implemented for the view switch in the view management program. The management operations are described in FIG. 7 (especially Step 10170). FIG. 10 shows a table content transition during the file archiving. As illustrated in the first view of FIG. 10, file /local/fs1 is first viewable and active for the NAS client, but is not available for the CAS client. In the "write" stage, i.e., the second view of FIG. 10, the file status is changed to pending for the NAS client and active for the CAS client. At this status, any NAS request other than "delete" would return a no file response. That is, the file is not available for NAS view other than for a delete operation. This is important as in this embodiment a standard archiving application is utilized. Since a standard archiving application performs a read-write-delete operations for archiving, it must be able to see the file in NAS view until the file has been deleted. On the other hand, the file cannot be made available to a NAS client for editing, as that would create an archived file that differs from the original edited NAS file.

Then, after the delete operation, the status for the NAS client is changed to N/A, while it remains active for the CAS client. Importantly, according to this embodiment, the file has not moved, but rather remained in its storage location. Instead, only its entries and status on the management table have been changed. Also, from the archiving application point of view, there is no difference between existing and the invented file archiving procedure, even if we employ the NAS/CAS unified system 2000. Therefore, no modification of the archiving system is necessary.

In the above embodiment, file movement is done by archive application, which means the archive application reads, writes, and deletes a file in a sequence. According to another embodiment of the invention, the movement is done by NAS/CAS unified system, and the archiving application issues a move operation to NAS/CAS unified system, instead of read, write, and delete. As for typical network file system protocols, such as NFS and CIFS, the move operation issued by client node translates into read, write, and delete operations of network file system protocol. However, some protocols such as WebDAV supports the server side movement, which means the protocol supports the move operation. In another case, NAS/CAS unified system can support a migration API, and archive application invokes the API. Then, the file movement is done by NAS/CAS unified system. The following descriptions are applicable in the above situations.

Figure 11:
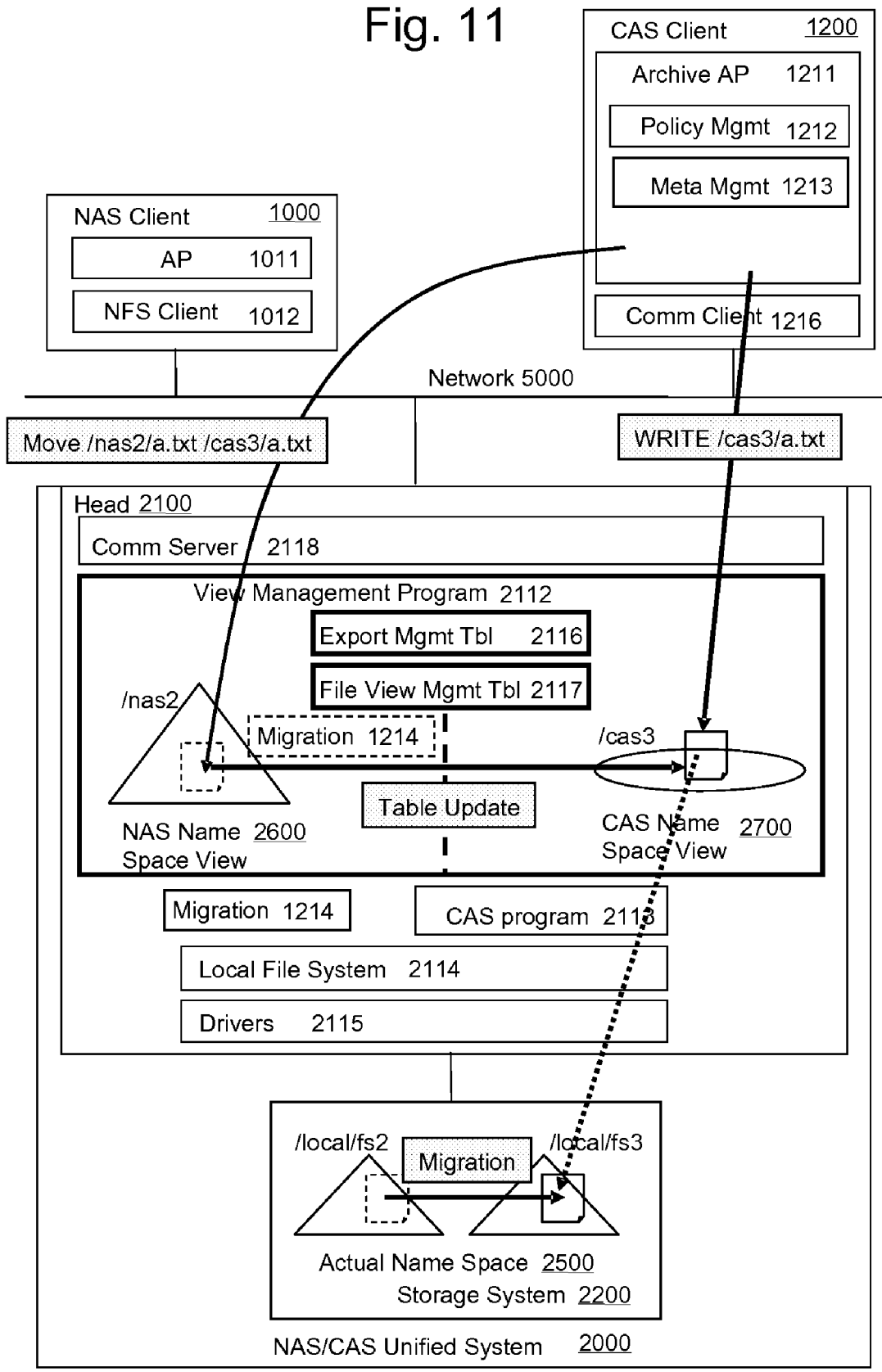
FIG. 11 represents a conceptual diagram of file archiving system with NAS/CAS unified system with migration feature according to an embodiment of the invention.
Figure 12:
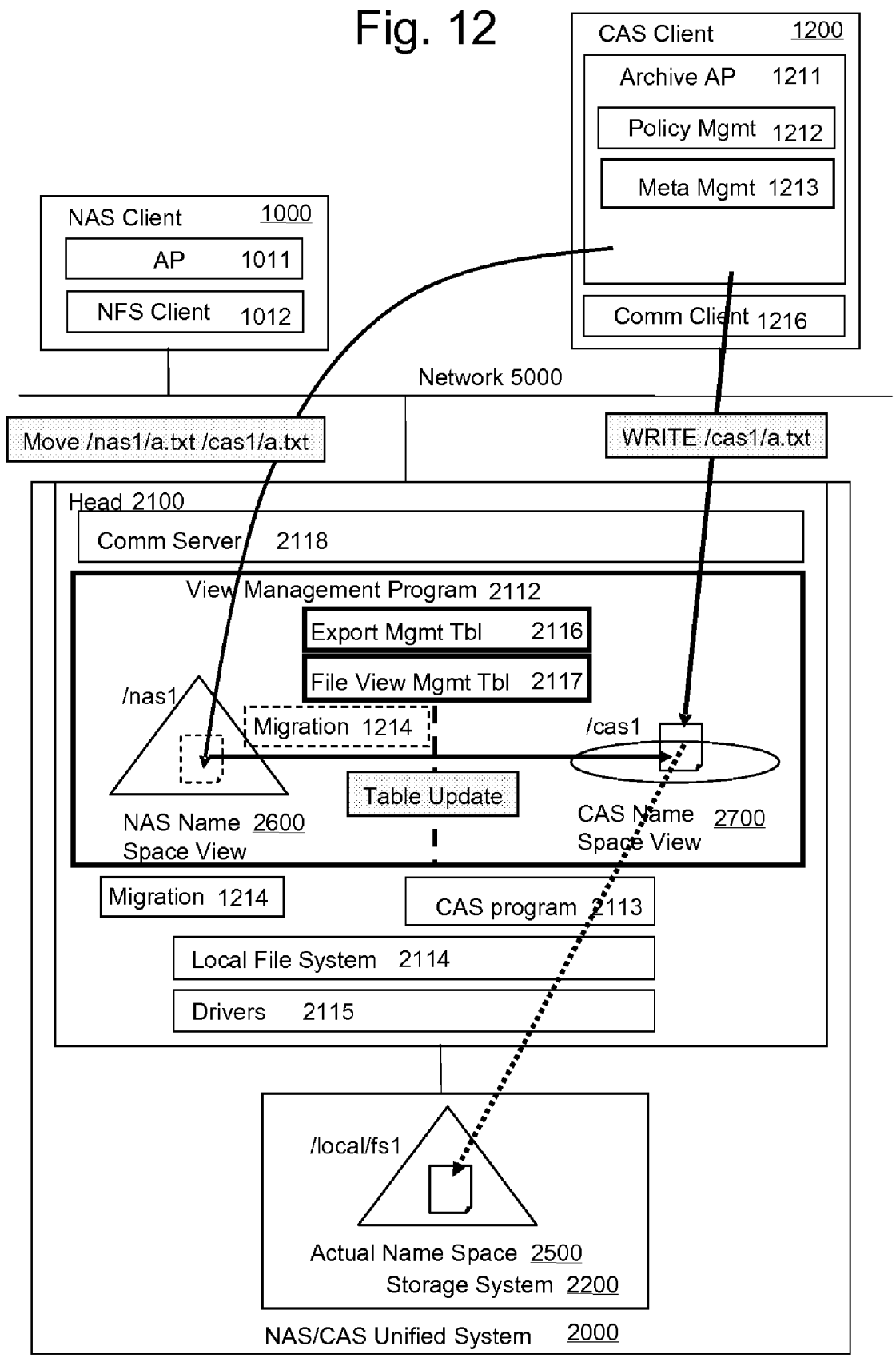
FIG. 12 represents a conceptual diagram of file archiving system with NAS/CAS unified system with migration feature.

FIG. 11 represents a conceptual diagram of file archiving system with NAS/CAS unified system with migration feature according to an embodiment of the invention. As shown in FIG. 11, migration function 1214 resides in head 2100 or in view management program 2112. In this case, a file is moved from NAS ("/nas2/a.txt") to CAS ("/cas3/a.txt"). This is a migration between different local file systems, and the actual file movement is necessary. FIG. 12 represents a conceptual diagram of file archiving system with NAS/CAS unified system with migration feature. In this case, a file is moved from NAS ("/nas1/a.txt") to CAS ("/cas1/a.txt"). This is a migration between different views, but on the same local file system. Then, the actual file movement is not necessary. Instead several management operations are performed for the view switch in the view management program. In either case, the following procedure is the same.

Figure 13:
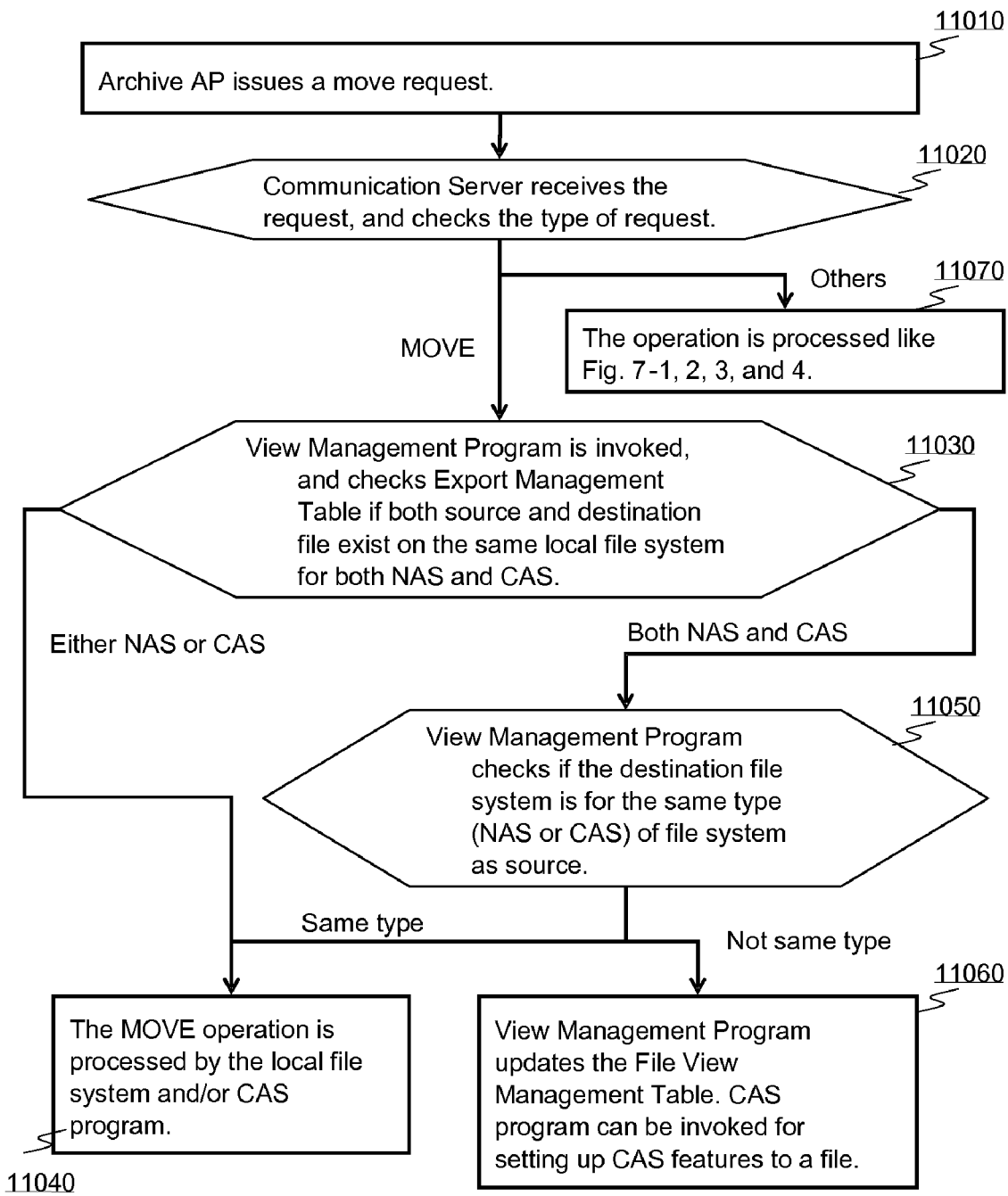
FIG. 13 shows an example of control flow of file archiving system with NAS/CAS unified system with migration feature.

FIG. 13 shows an example of control flow of file archiving system with NAS/CAS unified system with migration feature.

1. Archive AP 1211 issues a move request. (Step 11010)
2. Communication Server 2118 such as WebDAV and proprietary protocol server receives the request, and checks the type of request. (Step 11020)
   ① If the request is MOVE, View Management Program 2112 is invoked, and checks Export Management Table 2116 if both source and destination file exist on the same local file system for both NAS and CAS (Step 11030). In order to check, View Management Program sees the Export Management Table if the local file system has both NAS and CAS export name.

I. (For FIG. 11) If the local file system is for either NAS or CAS, the MOVE operation is processed by the local file system 2114 and/or CAS program 2113. (Step 11040)

II. If the local file system is for both NAS and CAS, View Management Program checks if the destination file system is for the same type (NAS or CAS) of file system as source. (Step 11050)

1. If the destination file system is for the same type of file system as source (NAS->NAS or CAS->CAS), the migration is not for archiving. Then, the MOVE operation is processed by the local file system 2114 and/or CAS program 2113. (Step 11040)

2. (For FIG. 12) If the destination file system is NOT for the same type of file system as source (NAS->CAS or CAS->NAS), View Management Program updates the File View Management Table 2117 such as delete source file entry and add destination file entry. Since just view switch is needed, the actual MOVE operation does not have to be processed by the local file system. However, CAS program 2113 can be invoked for setting up CAS features to a file. (Step 11060)

② Otherwise (actually this is not the case of file archiving), the operation is processed like FIGS. 7-1, 7-2, 7-3, and 7-4. (Step 11070)

3. Finally, Archive AP 1211 adds metadata to the moved file.

Figure 14:
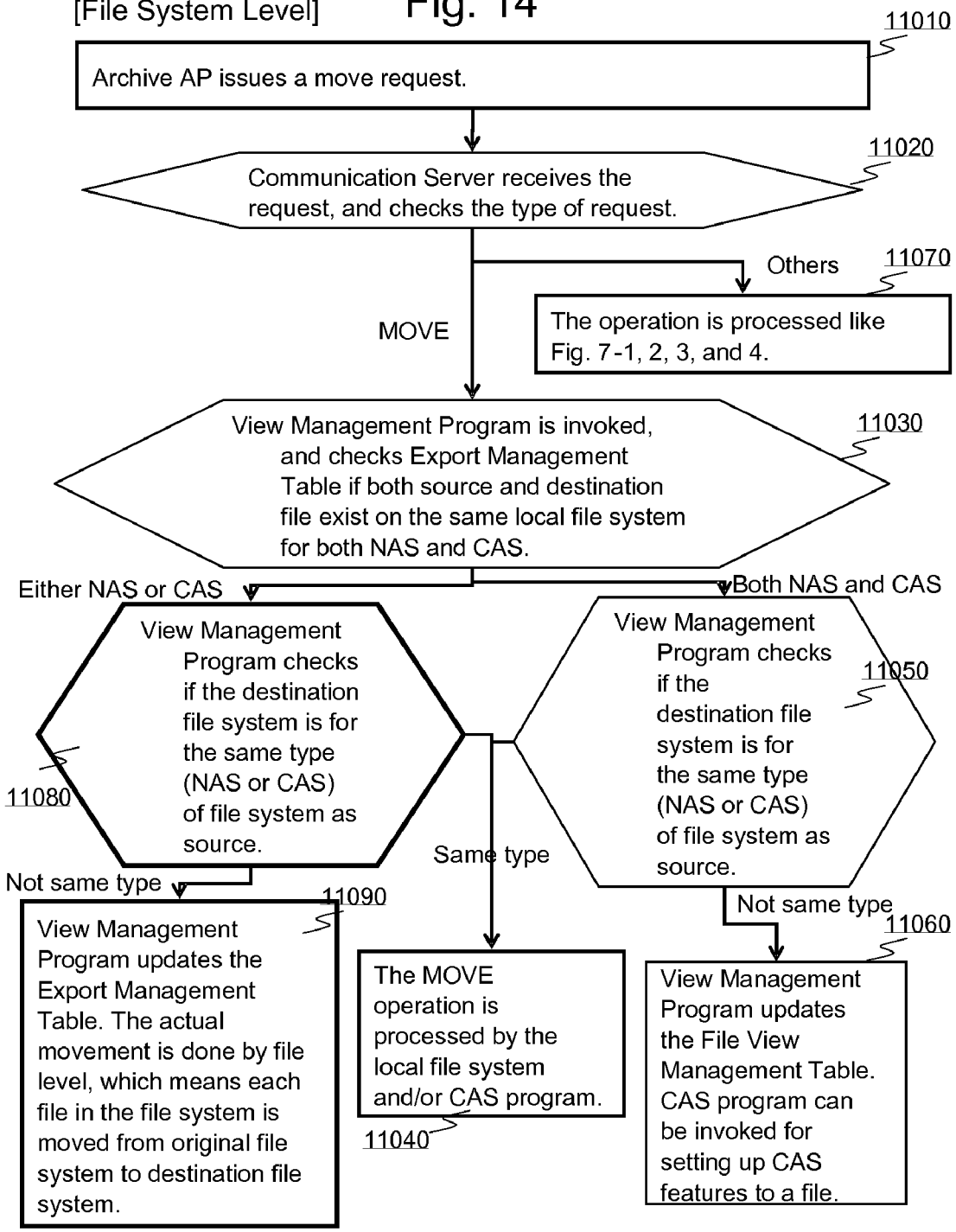
FIG. 14 represents an example of control procedure of file archiving system with NAS/CAS unified system with file system level migration feature according to an embodiment of the invention.

In the previous section, the migration is done by the granularity of file. In this section, the migration is done by the granularity of file system. The system environment is same as the previous section (FIGS. 11 and 12). FIG. 14 represents an example of control procedure of file archiving system with NAS/CAS unified system with file system level migration feature.

1. Archive application issues a move request in Step 11010
2. Communication server receives the request and checks the type of the request in Step 11020
   ① If the request is MOVE, the view management program is invoked and it checks if the source and destination file exist on the same local file system in 11030.
   I. If the local file system is for either NAS or CAS, View Management Program checks if the destination file system is for the same type (NAS or CAS) of file system as source. (Step 11080)
      1. If the same type of file system, proceed to Step 11040 and process the move request.
      2. If the destination file system is NOT for the same type of file system as source (NAS->CAS or CAS->NAS), View Management Program updates the Export Management Table 2117 such as delete source file system view entry and add destination file system view entry. The actual movement is done by file level, which means each file in the file system is moved from original file system to destination file system (Step 11090)
   II. If at Step 11030 the files exist on both NAS and CAS, the process proceeds to Step 11050, where View Management Program checks if the destination file system is for the same type (NAS or CAS) of file system as source.
      1. If the same type, proceed to Step 11040
      2. Otherwise proceed to Step 11060 for all files in source file system.

Figure 1:
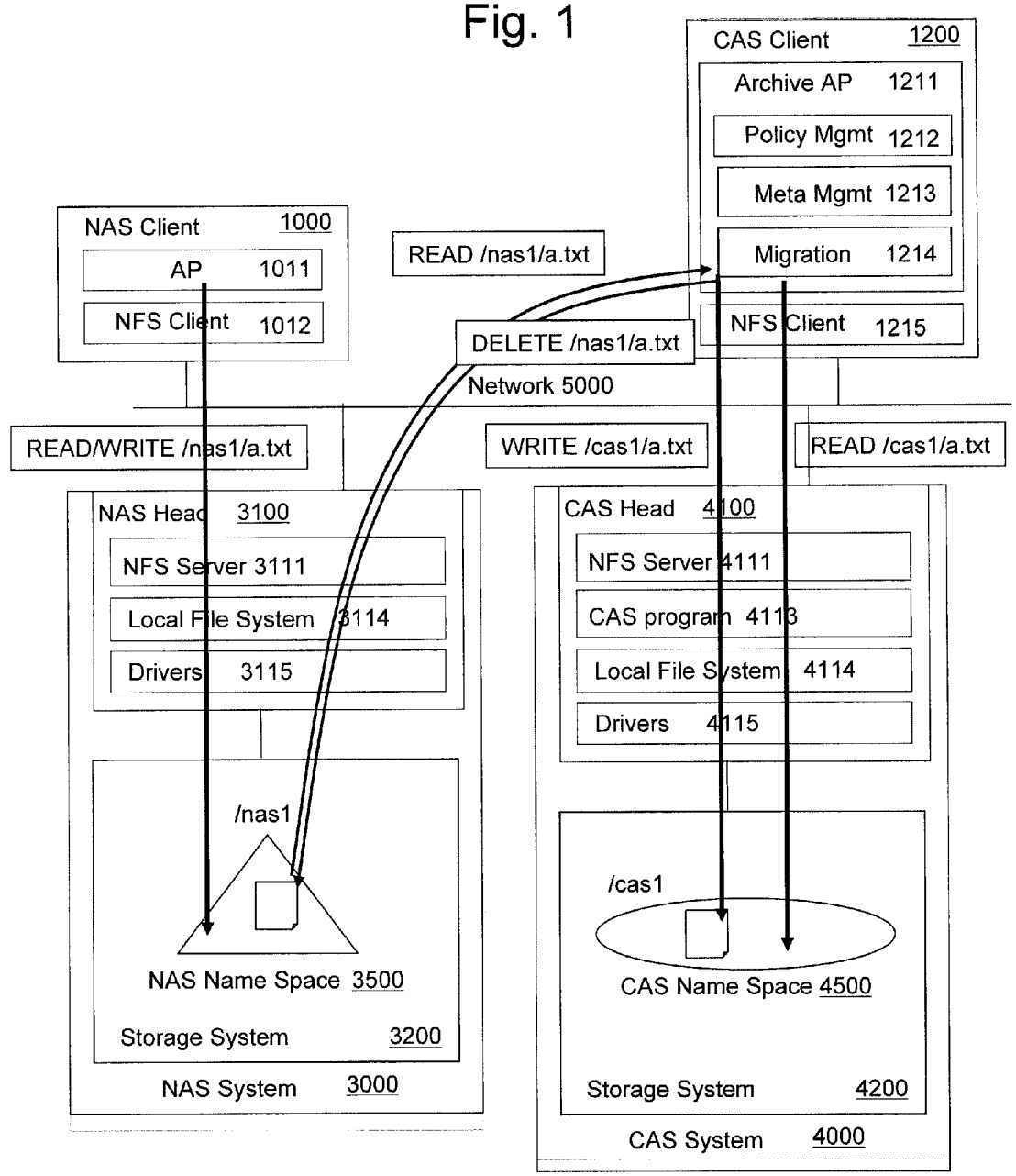
FIG. 1 schematically illustrates a conceptual diagram of an example of a prior art NAS and CAS linked systems.

② Otherwise, Step 11070 performs operations like those described with respect to FIGS. 7-1 to 7-4.

3. Finally, Archive AP 1211 adds metadata to the moved file.

In the above-described embodiment, just the migration feature is offloaded to the NAS/CAS unified system. However, some other archive application features, such as metadata addition, still remain on in the archive application. Therefore, the archive application still needs to write metadata after completing the move operation. In the following embodiment, the metadata addition feature is implemented in the NAS/CAS unified system. Consequently, the archive application does not have to do anything after completing the move operation.

Figure 15:
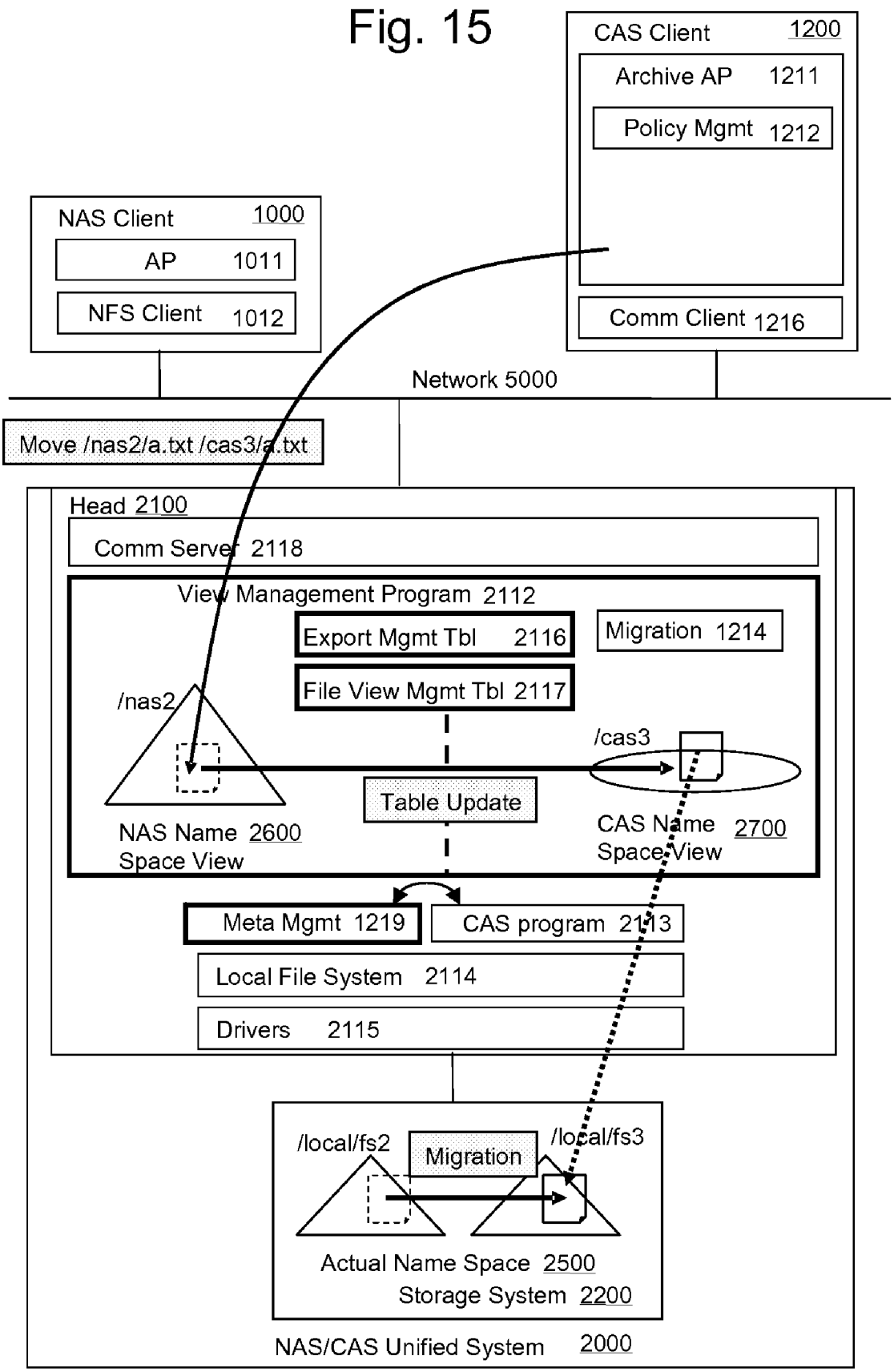
FIG. 15 illustrates a conceptual diagram of file archiving system with NAS/CAS unified system with migration and metadata management feature according to an embodiment of the invention.

FIG. 15 shows a conceptual diagram of file archiving system with NAS/CAS unified system with migration and metadata management feature. In this case, a file is moved from NAS ("/nas2/a.txt") to CAS ("/cas3/a.txt"). This is a migration between different local file systems, and the actual file movement is necessary. In another case, which is not depicted in the figure, a file is moved from NAS ("/nas1/a.txt") to CAS ("/cas1/a.txt"). This is a migration between different views, but on the same local file system. Then, the actual file movement is not necessary with several management operations for the view switch in the view management program. In either case, the following procedure is the same.

The difference from the previous embodiment is the metadata addition by NAS/CAS unified system (especially by Metadata Management program 1219), instead of archive application 1211 at the migration phase of the above procedures. The Metadata Management program invokes by View Management Program 2112, and manages pre-determined metadata by administrator. Moreover, any appropriate features such as compression can be turned on or off at the migration time as far as the features implemented in the NAS/CAS unified system. Additionally, the metadata management program 1219 may be part of the CAS program 2113, as illustrated by the double-headed arrow.

As can be appreciate from the above description, one feature of the subject invention is the provision of the view management program between the NFS server and the local file system. Conventionally, the NFS server receives requests from an NFS client and provides the requests to the local file system. However, according to embodiments of this invention, the view management server intercepts the request from the NFS server to the local file system. The view management program checks to identify the source of the request, i.e., NAS client or CAS client. If the request originates from a NAS client, the system acts as a NAS system, while if the request originates from a CAS client, the system responds as a CAS system. Consequently, while the NAS and CAS systems are implemented as a single integrated system, the system can provide separate views to NAS and CAS clients. When a NAS client accesses the integrated NAS/CAS system, the system provides NAS features to the client, while when a CAS client accesses the system it provides CAS features to the client.

As can also be appreciated from the above description, when a file needs to be migrated from NAS to CAS, e.g., for archiving purposes, the file does not need to be moved. Rather, by changing the entries in the management tables, the file properties can be changed from NAS file into a CAS file. At the time of the change, other CAS features can be added to or associated with the file, such as, e.g., metadata, retention policy, etc. This saves on bandwidth requirement for the network system and avoids security issues involved in migrating files from NAS to CAS.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C/C++, perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A method for providing and managing an integrated network attached storage (NAS) and content addressable storage (CAS) system, the method comprising:
   providing a storage system having a network interface, storage head, and at least one logical unit;
   operating a view management program to review each client request received from the network interface and determine whether the source of the request is a NAS client or a CAS client; and,
   providing a NAS view when the source is a NAS client and a CAS view when the source is a CAS client;
   maintaining an export management table having entries therein corresponding to local file system name, export name for NAS, file system ID for NAS, export name for CAS, and file system ID for CAS, and access control information;
   maintaining a file view management table having entries therein corresponding to local file system name, file name, NAS view pointer, NAS status, CAS view pointer, and CAS status; and
   upon receiving an archiving request for a designated file from a CAS client, changing corresponding entries in the view status table while maintaining the file at the same storage location.

2. The method of claim 1, further comprising:
   upon receiving an archiving request for a designated file from a CAS client, changing the status of the designated file to "pending" whereby the file is not available for a NAS operation other than a delete operation.

3. The method of claim 2, wherein the status of the designated file is changed to "inactive" after the CAS client performed a delete operation of the designated file.

4. The method of claim 1, further comprising associating metadata and retention policy with the designated file.

5. An integrated network attached storage (NAS) and content addressable storage (CAS) system, comprising:
   a network interface;
   a storage system head;
   a storage controller;
   at least one physical storage device;
   a view management program operable by the storage head;
   an export management table having entries therein corresponding to local file system name, export name for NAS, file system ID for NAS, export name for CAS, and file system ID for CAS, and access control information; and
   a file view management table having entries therein corresponding to local file system name, file name, NAS view pointer, NAS status, CAS view pointer, and CAS status;
   wherein the storage head operates to serve requests received from the network interface and provide a NAS view or CAS view according to the type of the requests and according to whether the requests originate from a NAS client or CAS
   wherein upon receiving an archiving request for a designated file from a CAS client, changing corresponding entries in the view status table while maintaining the file at the same storage location.

6. The system of claim 5, further comprising a migration module operable within the storage head.

7. The system of claim 6, further comprising metadata management module.

8. The system of claim 5, further comprising a CAS client coupled to the network interface.

9. The system of claim 8, wherein the CAS client comprises an archiving module.

10. In an integrated network attached storage (NAS) and content addressable storage (CAS) system having a network interface, a storage system head, a storage controller, and at least one physical storage device, a method for archiving a file, comprising:
    upon receiving from a CAS client an archiving read request for a specified file on a NAS view via the network interface, presenting the file to the CAS client;
    issuing an operation failed or file doesn't exist indication for any request other than "delete" received from a client to the specified file on a NAS vie
    upon receiving indication that archiving operation has been completed, issuing a "file does not exist" indication for any request received from a client to the specified file on a NAS view;
    upon receiving the archiving request for the specified file, changing corresponding entries in a view status table while maintaining the file at its current storage location; and
    maintaining an export management table having entries therein corresponding to local file system name ex ort name for NAS, file system ID for NAS, export name for CAS, and file system ID for CAS, and access control information; and further comprising maintaining a file view management table having entries therein corresponding to local file system name, file name, NAS view pointer, NAS status, CAS view pointer, and CAS status.

11. The method of claim 10, further comprising upon receiving the archiving request for the specified file, changing a status indicator of the specified file to "pending" whereby the file is not available for a NAS operation other than a delete operation.

* * * * *

UNITED STATES PATENT AND TRADEMARK OFFICE
CERTIFICATE OF CORRECTION

| | | |
|---|---|---|
| PATENT NO. | : 7,870,154 B2 | Page 1 of 1 |
| APPLICATION NO. | : 11/864063 | |
| DATED | : January 11, 2011 | |
| INVENTOR(S) | : Hidehisa Shitomi et al. | |

It is certified that error appears in the above-identified patent and that said Letters Patent is hereby corrected as shown below:

Column 2, line 67: Delete "mat" and insert -- may --,

Column 3, line 18: Delete "device;" and insert -- device. --,

Column 10, line 21: Delete "mode" and insert -- inode --,

Column 11, line 49: Delete "file" and insert -- file. --,

Column 16, line 20: In Claim 5, delete "CAS" and insert -- CAS; --,

Column 16, line 43: In Claim 10, delete "vie" and insert -- view; --,

Column 16, line 53: In Claim 10, delete "name ex ort" and insert -- name, export --, Signed and Sealed this
Twenty-fourth Day of May, 2011

David J. Kappos
*Director of the United States Patent and Trademark Office*